United States Patent
Bennett et al.

(10) Patent No.: US 9,773,118 B1
(45) Date of Patent: Sep. 26, 2017

(54) DATA DEDUPLICATION WITH ENCRYPTION

(71) Applicant: IONU SECURITY, INC., Campbell, CA (US)

(72) Inventors: David W. Bennett, Longmont, CO (US); Alan M. Frost, Reno, NV (US)

(73) Assignee: IONU Security, Inc., Longmont, CO (US)

( * ) Notice: Subject to any disclaimer, the term of this patent is extended or adjusted under 35 U.S.C. 154(b) by 692 days.

(21) Appl. No.: 14/332,089

(22) Filed: Jul. 15, 2014

(51) Int. Cl.
*G06F 21/00* (2013.01)
*G06F 21/60* (2013.01)

(52) U.S. Cl.
CPC .................... *G06F 21/60* (2013.01)

(58) Field of Classification Search
CPC ....................................... G06F 21/60
USPC ........................................ 713/193
See application file for complete search history.

(56) References Cited

U.S. PATENT DOCUMENTS 9,116,849 B2 *  8/2015  Nayshtut ............ G06F 21/6227

* cited by examiner

*Primary Examiner* — Longbit Chai
(74) *Attorney, Agent, or Firm* — Crawford Maunu PLLC

(57) ABSTRACT

Approaches for deduplicating data include generating a first key from plain text data of a first data element. The first data element is encrypted using the first key. The first key is compared to each key of a plurality of previously stored keys, which are associated with other encrypted data elements. In response to the first key matching a second key of the plurality of previously stored keys, the encrypted first data element is compared to the other encrypted data element associated with the second key. In response to the encrypted first data element matching the other encrypted data element, the first key is associated with the other encrypted data element, and the encrypted first data element is discarded.

20 Claims, 7 Drawing Sheets

DATA DEDUPLICATION WITH ENCRYPTION

FIELD OF THE INVENTION

One or more embodiments generally relate to data deduplication.

BACKGROUND

Data deduplication generally involves eliminating duplicate storage of identical data. In contrast to some data compression techniques that identify small quantities of data that are repeated within a file, data deduplication identifies large sections of data that are duplicative and stores only one copy of that data. References to the one copy are established for the files having that duplicated data.

In some data deduplication techniques, a particular hash function is computed on individual blocks of a file, and the hash value is compared to hash values that have been previously computed for different blocks and/or different files. If the hash value matches a previously computed hash value, the block is compared to the previously stored block. If the data matches, a reference to the previously stored data is stored instead of storing the data block.

Data encryption may create problems for data deduplication techniques. Different encryption keys for different users and different files are often used to protect the file data. Since different encryption keys are used, the hash values of the stored data will not match for files containing identical underlying plaintext data. Thus, data deduplication efforts may be unable to satisfactorily protect data from unauthorized access, and data encryption efforts are generally unable to benefit from data deduplication techniques.

SUMMARY

In one embodiment, a process of deduplicating data includes generating a first key from plain text data of a first data element. The first data element is encrypted using the first key. The first key is compared to each key of a plurality of previously stored keys, which are associated with other encrypted data elements. In response to the first key matching a second key of the plurality of previously stored keys, the encrypted first data element is compared to the other encrypted data element associated with the second key. In response to the encrypted first data element matching the other encrypted data element, the first key is associated with the other encrypted data element, and the encrypted first data element is discarded.

In another embodiment, a method of data deduplication includes generating a first key from plaintext data of a first data element. A counter value is encrypted using a file encryption key (FEK). An exclusive-or function is applied to the data element and the counter, resulting in a protected element. The first key is compared to each key of a plurality of previously stored keys. The keys of the plurality of previously stored keys are associated with other protected data elements, respectively. In response to the first key matching a second key of the plurality of previously stored keys, the protected first data element is compared to the other protected data element associated with the second key. In response to differences between the protected first data element and the other protected data element associated with the second key being less than a threshold, differences between the protected first data element and the other protected data element are stored, the first key is associated with the stored differences and the other protected data element, and the protected first data element is discarded.

A system that deduplicates data is provided in another embodiment. The system includes a memory arrangement and a processor coupled to the memory arrangement. The memory arrangement is configured with instructions that when executed by the processor cause the processor to generate a first key from plain text data of a first data element. The first data element is encrypted using the first key. The first key is compared to each key of a plurality of previously stored keys, which are associated with other encrypted data elements. In response to the first key matching a second key of the plurality of previously stored keys, the encrypted first data element is compared to the other encrypted data element associated with the second key. In response to the encrypted first data element matching the other encrypted data element, the first key is associated with the other encrypted data element, and the encrypted first data element is discarded.

Another system that deduplicates data is also provided. The system includes a memory arrangement and a processor coupled to the memory arrangement. The memory arrangement is configured with instructions that when executed by the processor cause the processor to generate a first key from plaintext data of a first data element. A counter value is encrypted using the FEK. An exclusive-or function is applied to the data element and the counter, resulting in a protected element. The first key is compared to each key of a plurality of previously stored keys. The keys of the plurality of previously stored keys are associated with other protected data elements, respectively. In response to the first key matching a second key of the plurality of previously stored keys, the protected first data element is compared to the other protected data element associated with the second key. In response to differences between the protected first data element and the other protected data element associated with the second key being less than a threshold, differences between the protected first data element and the other protected data element are stored, the first key is associated with the stored differences and the other protected data element, and the protected first data element is discarded.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION OF THE DRAWINGS

The disclosure describes approaches for combining data deduplication with encryption. For each data element to be encrypted, a key is generated from the plain text data of that data element. The data element may be one or more blocks of a file or an entire file, for example. The data element may then be encrypted using the generated key.

The generated key is compared to stored keys that were previously generated for other data elements. If the generated key matches one of the stored keys, the in-process encrypted data element is considered for deduplication. The in-process encrypted data element is compared to the previously encrypted data element that is associated with the matching key to determine whether or not the data elements completely match. If the in-process encrypted data element matches the previously encrypted data element, the generated key is associated with the previously encrypted data element, and the in-process encrypted data element may be discarded. By replacing the discarded data with a reference to the previously stored data, the storage locations in which the data was stored may be released for storage of different data.

Figure 1:
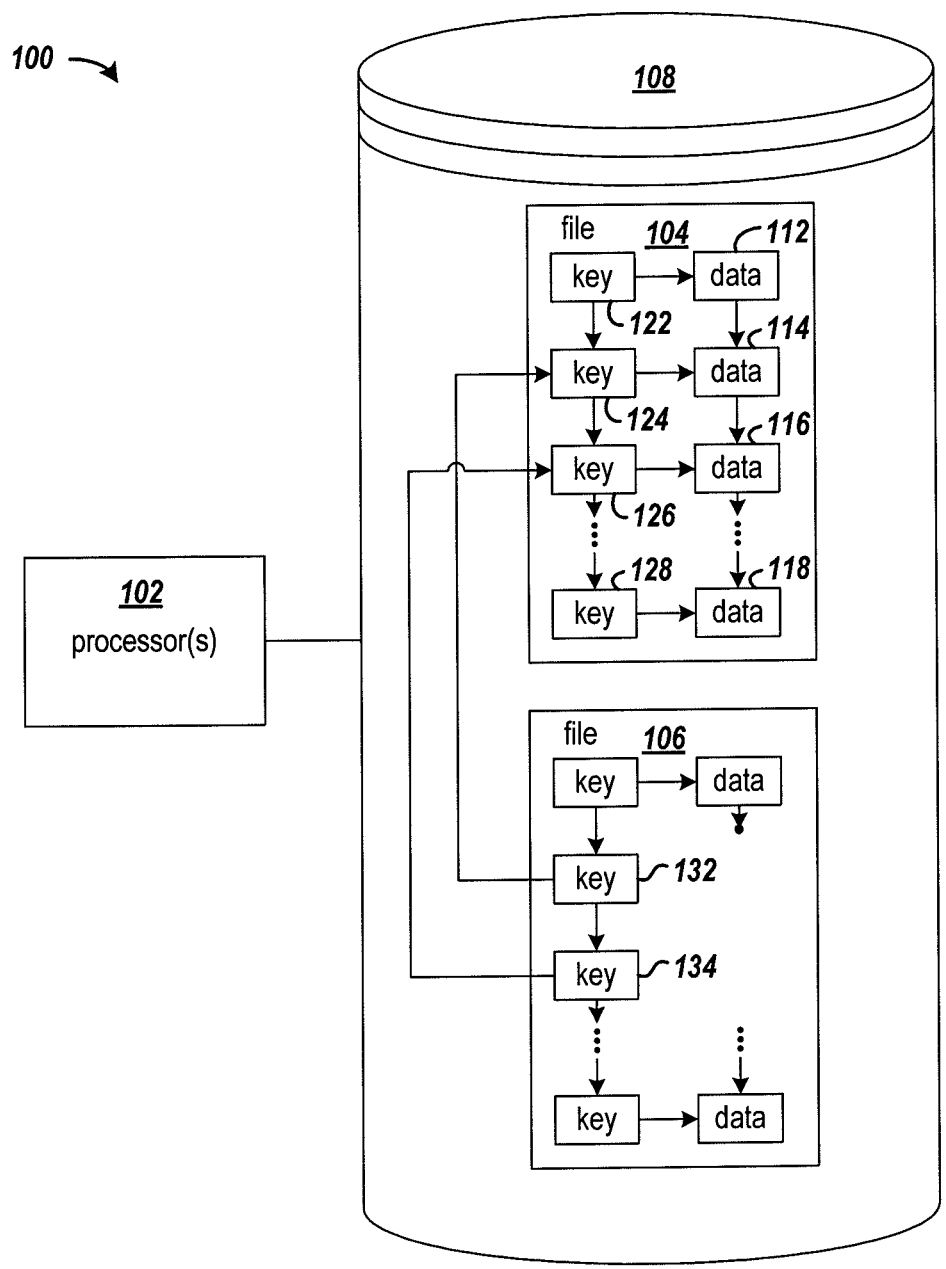
FIG. 1 shows a system in which first and second files have encrypted data, and some data in the second file has been deduplicated.

FIG. 1 shows a system 100 in which first and second files have encrypted data, and some data in the second file has been deduplicated. In the second file, keys that are associated with the deduplicated data reference corresponding keys in the first file. The system generally includes a computing arrangement having one or more processors 102 programmed to access files 104 and 106 in storage arrangement 108 and perform the encryption and deduplication described herein. It will be appreciated that various alternative computing architectures may be configured and specifically programmed to implement the disclosed encryption and deduplication. The processor(s) and storage arrangement may implement a centralized or a distributed file system.

File 104 includes multiple encrypted data elements, as shown by blocks 112, 114, 116, and 118. The encrypted data elements are associated with corresponding keys 122, 124, 126, and 128. The directional arrow from a key to a data element represents the association of a data element with the key. In one implementation, a data structure may include the key and a pointer to the storage location of the associated data element. The order of data elements in the file may be indicated with links between keys and/or links between data elements. For example, the directional line from key 122 to key 124 indicates that data element 112 logically precedes data element 114 in the file. The data elements may be stored in data structures that include pointers to the storage location of the next data element in the file.

File 106 is an example of a file in which data elements have been deduplicated. Keys 132 and 134 reference keys 124 and 126, respectively. Data elements 114 and 116, which are associated with keys 124 and 126, are elements of both file 104 and 106. Data elements 114 and 116 are shown as being contained within a block representing file 104, because keys 124 and 126 may have been generated from data elements 114 and 116 as part of file 104 before keys 132 and 134 were generated. Keys 132 and 134 reference the previously generated keys, which in turn reference the data elements 114 and 116.

Figure 2:
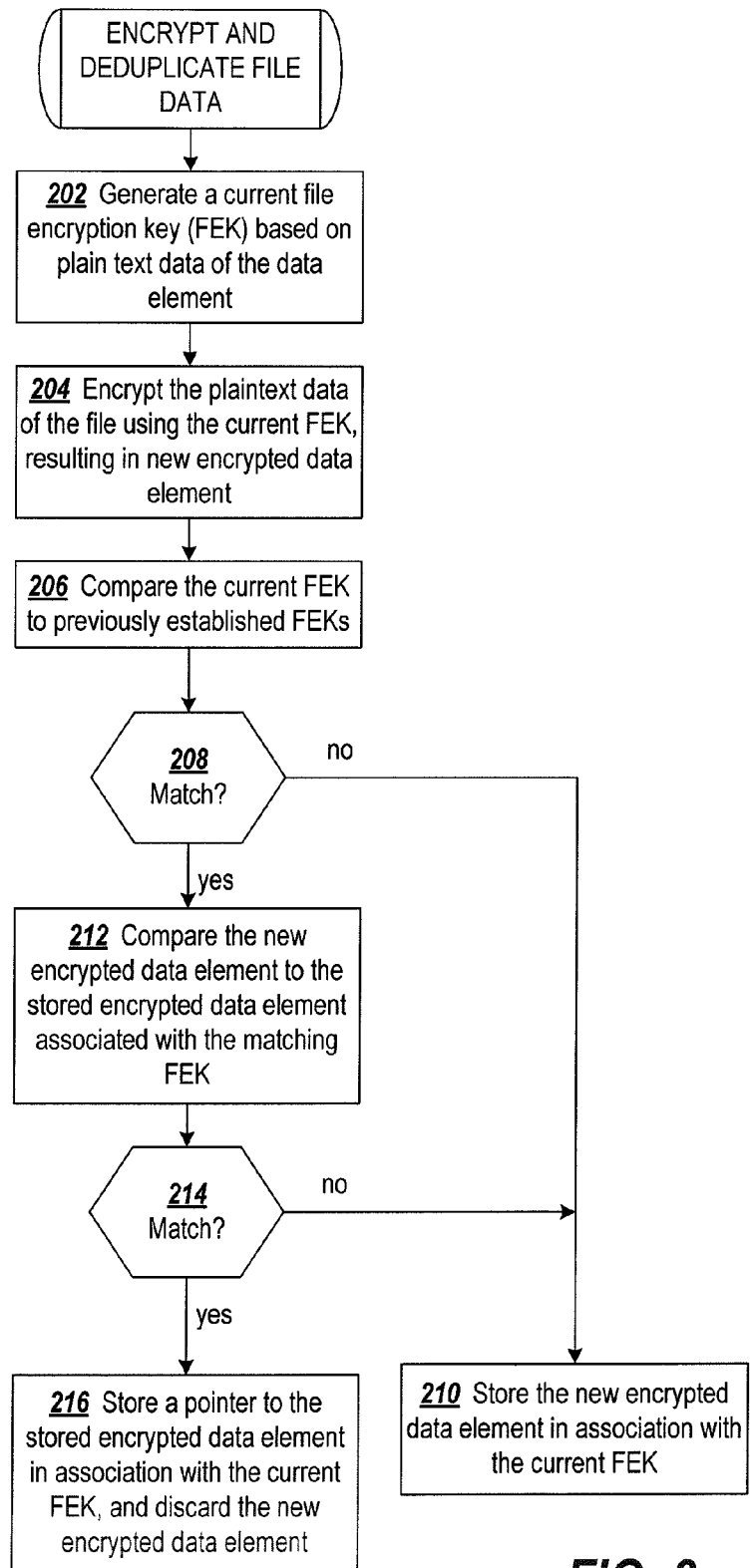
FIG. 2 shows a flowchart of a process in which file data is encrypted and deduplicated.

FIG. 2 shows a flowchart of a process in which file data is encrypted and deduplicated. At block 202, a current file encryption key (FEK) is generated based on plaintext data of a data element. The FEK may be generated using a cryptographic hash algorithm such as SHA256, or a key derivation algorithm such as PBKDF2.

In addition to the plaintext data of the data element, additional metadata may be used in generating the FEK. For example, in one implementation, an identifier of a storage location of the data element may be used in conjunction with the plaintext data to generate the FEK. The identifier of the storage location may indicate a network address and an identifier of a file in a file system, for example.

The data element may be a single block, a group of blocks, or an entire file of data, depending on implementation objectives. For example, the data element may be a single block and all the plaintext data of the block may be used to generate the FEK. Alternatively, the data element may be a file having multiple blocks, and the FEK may be generated based on one or more of the blocks of the file, or from all the blocks of the file.

At block 204, the plaintext data of the data element is encrypted using the FEK, and at block 206, the FEK is compared to previously established FEKs. The previously established FEKs may be stored in a database that maps locations of encrypted data elements to the FEKs used to encrypt those data elements. Alternatively, the FEKs may be stored as part of a file such as in header blocks. If the FEK does not match any previously generated FEK, decision block 208 directs the process to block 210, where the encrypted data element is stored in association with the FEK. The stored FEK and encrypted data element may then be used for subsequent deduplication checks.

In some implementations, a file may include meta-data along with non-meta-data. The meta-data generally describes the non-meta-data and may include information such as a file size, permissions, the FEK, as well as other information. Different meta-data in different files may result in identical non-meta-data in different files having different block alignments. If FEKs are generated at the block level, duplicate data may not be detected because of the different block alignments. In one implementation, the encrypted data elements are stored in alignment with block boundaries. For example, the first word of a data element is stored in the first word of a block of physical storage. In one implementation, the storing of the encrypted data element in alignment with a block boundary may be in response to a user-configurable parameter that specifies a block size. In another implementation, user configurable parameters may indicate different block sizes for aligned storage of different sizes of encrypted data elements.

If the FEK matches one of the stored FEKs, at block 212, the process compares the newly encrypted data element to the stored encrypted data element that is associated with the matching FEK. If the encrypted data elements do not match, decision block 214 directs the process to block 210, which stores the encrypted data element and FEK as described above. Otherwise, at block 216, the new FEK is associated with the previously stored encrypted data element, and the new encrypted data element is discarded. For example, a pointer may be stored for the new FEK to reference either the matching FEK or the stored encrypted data element.

Figure 3:
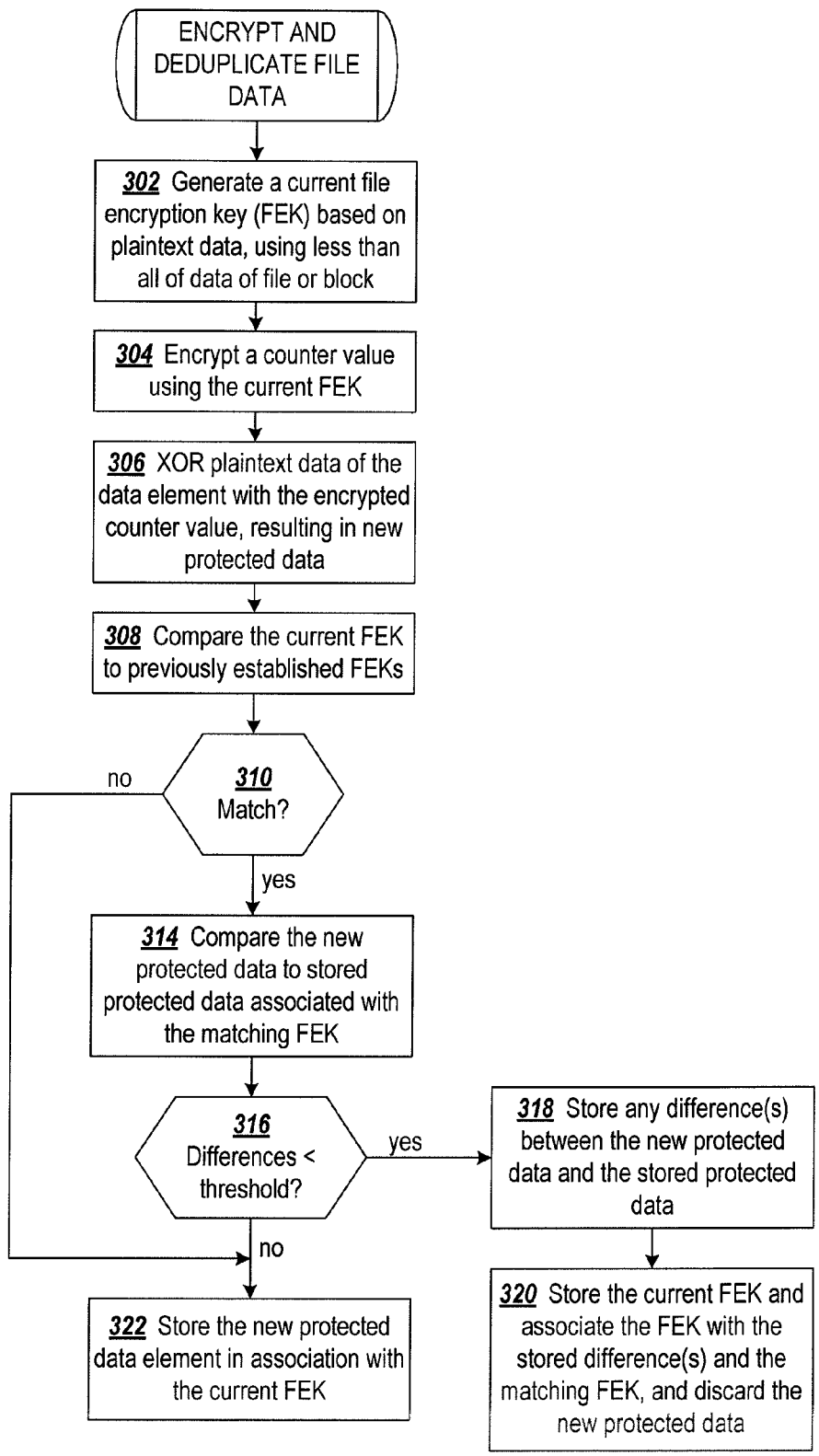
FIG. 3 shows a flowchart of another process in which file data is encrypted and deduplicated.

FIG. 3 shows a flowchart of another process in which file data is encrypted and deduplicated. The process of FIG. 3 differs from the process of FIG. 2 in that data elements that are not complete duplicates of one another may be deduplicated. Instead of using every byte of the data element to generate the FEK, a subset of the data element is used to generate the FEK. In addition, a counter mode is used to protect the data rather than directly encrypting the data element with an FEK.

At block 302, an FEK is generated based on plaintext data of the data element. In one implementation, the FEK is generated using less than all of the data of the data element. For example, a hash function may be applied to every nth byte of the data element (hash (byte-n, byte 2n, byte 3n, ... )). Alternatively, the values of the bytes of the data element may be summed, and the lower n bits of the total discarded. Other approaches may be equally or better suited to produce a matching FEK when there are minimal differences between data elements while producing a unique FEK for data elements that are substantially different, depending on implementation requirements.

Blocks 304 and 306 implement a counter mode for protecting the data element. A counter value is encrypted at block 304 using the FEK generated at block 302, and an exclusive-or (XOR) function is applied to the plaintext data of the data element and the FEK at block 306. At block 308, the current FEK is compared to previously stored FEKs. The previously established FEKs may be stored in a database that maps locations of protected data elements to the FEKs used to protect those data elements. Alternatively, the FEKs may be stored as part of a file such as in header blocks. If the FEK does not match any previously generated FEK, decision block 310 directs the process to block 322, where the protected data element is stored in association with the FEK. The stored FEK and protected data element may then be used for subsequent deduplication checks. The protected data element may be stored and aligned with block boundaries as described above in regards to FIG. 2.

If the FEK matches one of the stored FEKs, at block 314, the process compares the newly protected data element to the stored protected data element that is associated with the matching FEK.

If the number of differences between the protected data element and the stored protected data element is less than a threshold number at decision block 316, the process proceeds to block 318. The threshold number is application dependent and may specify a number of bytes, for example. At block 318, the data in the byte or bytes that differ, along with an indication of which byte or bytes differ, are stored. At block 320, the FEK is stored and associated with the stored differences and with the matching FEK. The new protected data may then be discarded. If the number of differences between the protected data element and the stored protected data element is not less than the threshold number, at block 322 the protected data element is stored in association with the FEK as described above.

Figure 4:
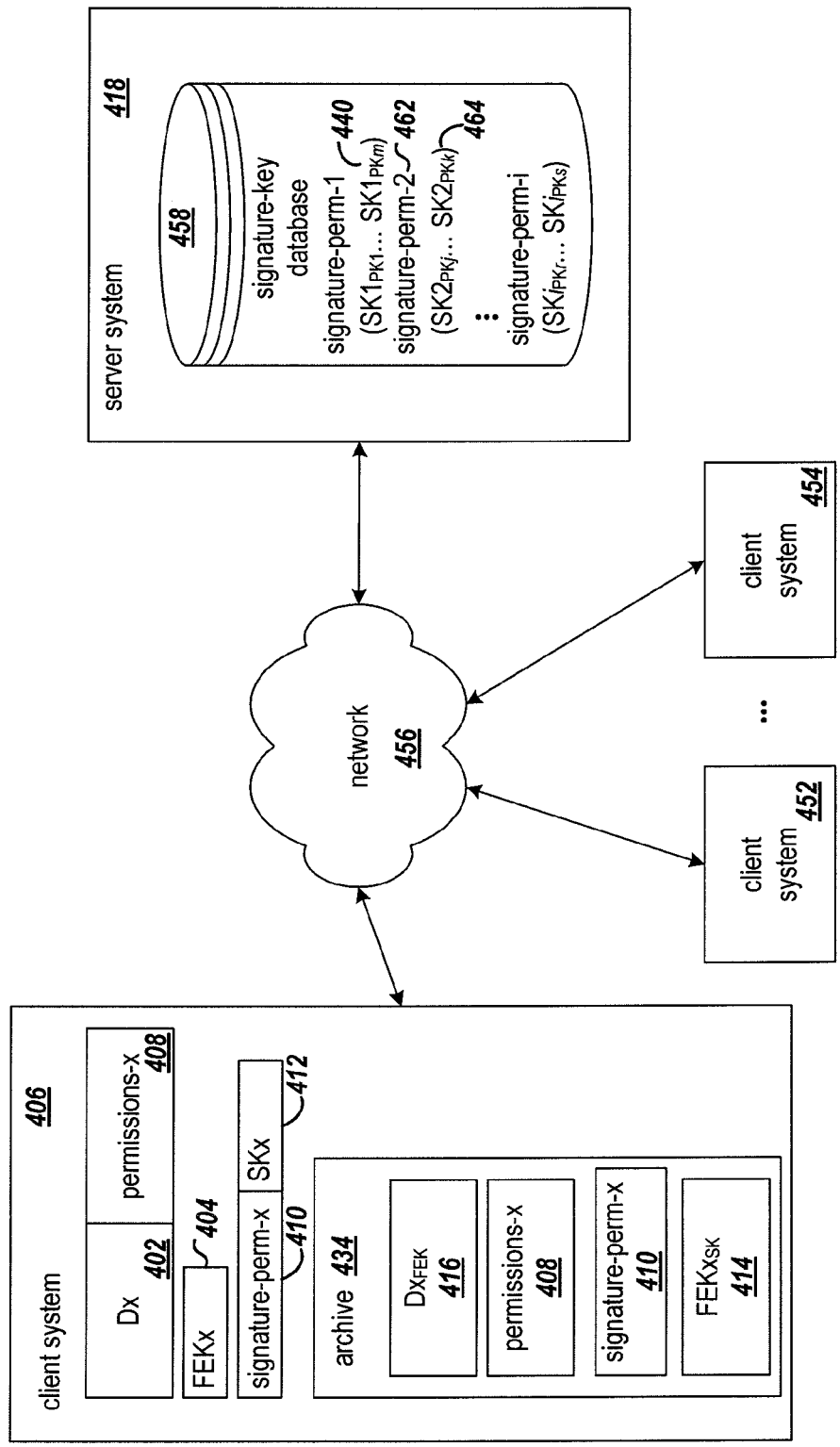
FIG. 4 is a block diagram that shows a computing arrangement in which a data element is shared by multiple devices and/or users.

FIG. 4 is a block diagram that shows a computing arrangement in which a data element is shared by multiple devices and/or users. The computing arrangement of FIG. 4 may implement the deduplication and encryption approaches described in FIGS. 1-3 in conjunction with the encryption approaches described below. Though only one data element is illustrated, it will be appreciated that the methods and systems may be readily extended to support the sharing of multiple data elements. The computing arrangement includes multiple client systems 406, 452, and 454 that are communicatively coupled to a server system 418 by a network 456, such as the Internet. The client systems share access to data element Dx 402.

Client system 406 is shown as being the system on which data element Dx 402 is created. Permissions 408 (permissions-x) are stored in association with the data element Dx. The permissions indicate which users have read access or read and write access to the data element. A signature 410 is generated from the permissions 408. In an example implementation, the permissions are represented using Java-script object notation (JSON), and the signature is an MD5 hash of the left-most 12 bytes.

Data element Dx 402 is encrypted using a file encryption key (FEKx) 404, and the FEKx is encrypted using a shared encryption key (SKx) 412. The encrypted FEKx (FEKx$_{SK}$) is stored in association with encrypted data element Dx (Dx$_{FEK}$). In an example implementation, the FEKx$_{SK}$ 414 and Dx$_{FEK}$ 416, along with permissions-x 408 and signature-perm-x 410, are stored in archive 434, such as a POSIX tar format archive.

In an example implementation, the file encryption key FEK is generated as described above in the approaches shown in FIGS. 2 and 3. The shared key SK may be a random 256-bit AES key. An archive may have more than one encrypted data element. For example, multiple shared documents may be stored in the same archive. The FEK is only retentively stored in encrypted form. The FEK is not stored in retentive storage (e.g., disk) in plaintext form and is shredded from RAM of the client system when it is no longer needed.

The shared key SKx 412 is encrypted on the client system using a public key of a public-private key pair of the owner or creator of the data element Dx 402. The shared key SKx may also be encrypted with the public keys of the other users who will be sharing access to the data element, thereby creating multiple instances of the encrypted shared key. The encrypted shared key(s) is transmitted along with the signature 410 to the server system 418 for storage.

In one implementation, the server system maintains a database 458 of signatures and associated sets of encrypted shared keys. Each signature covers an archive, and the associated set of encrypted shared keys are for those users who are permitted access to the data element in the archive. In the example database 458, signature-perm-x 410 from the client system is stored as one of the signatures signature-perm-1-signature-perm-i. For purposes of referencing the encrypted shared keys, the label for each encrypted shared key identifies the data element with which it is associated and the user whose public key was used to encrypt the shared key. For example, the label of shared key 440 is SK1$_{PKm}$, which indicates that the shared key is for data element 1 and is encrypted with the public key of user m.

The same signature will be generated for all data elements that have the same permissions. If the permissions are the same, the same set of people are allowed to access the data element, so the same shared key may be used. In this way, the local key ring can be kept fairly small. For data elements with same permissions, a server need not be repeatedly queried for the shared key.

Once the archive 434 has been created and the signature and associated encrypted versions of the shared key have been established at the server, the data element may be shared between users at the client systems 406, 452, and 454. As indicated above, the archive may be shared by way of a file server, email, or various other forms of file transfer.

When the archive has been established at a client system for reading, the client system needs to have the shared key in order to decrypt the encrypted FEKx$_{SK}$ 414 from the archive. The client system checks whether or not the signature of the permissions 410 in the archive matches a locally stored signature, which has associated encrypted shared keys. If the signature is not locally stored, the client system obtains the signature and associated encrypted shared keys from the server system 418. The user who is requesting to read the data element provides his private key, and the private key is used to decrypt the encrypted shared key. For example, if the data element is data element 2, the signature-perm-2 462 has associated encrypted shared keys 464, and the client system decrypts the one of shared keys 464 that belongs to the user with the user's private key. Note that the encrypted shared keys may be tagged with information that identifies the user whose public key was used to encrypt the shared key so that the proper encrypted shared key may be decrypted.

Using the decrypted shared key, the client system decrypts the encrypted file encryption key $FEKx_{SK}$ 414 from the archive. The decrypted FEK is then used by the client system to decrypt the encrypted data element $Dx_{FEK}$ 416 from the archive.

Figure 5:
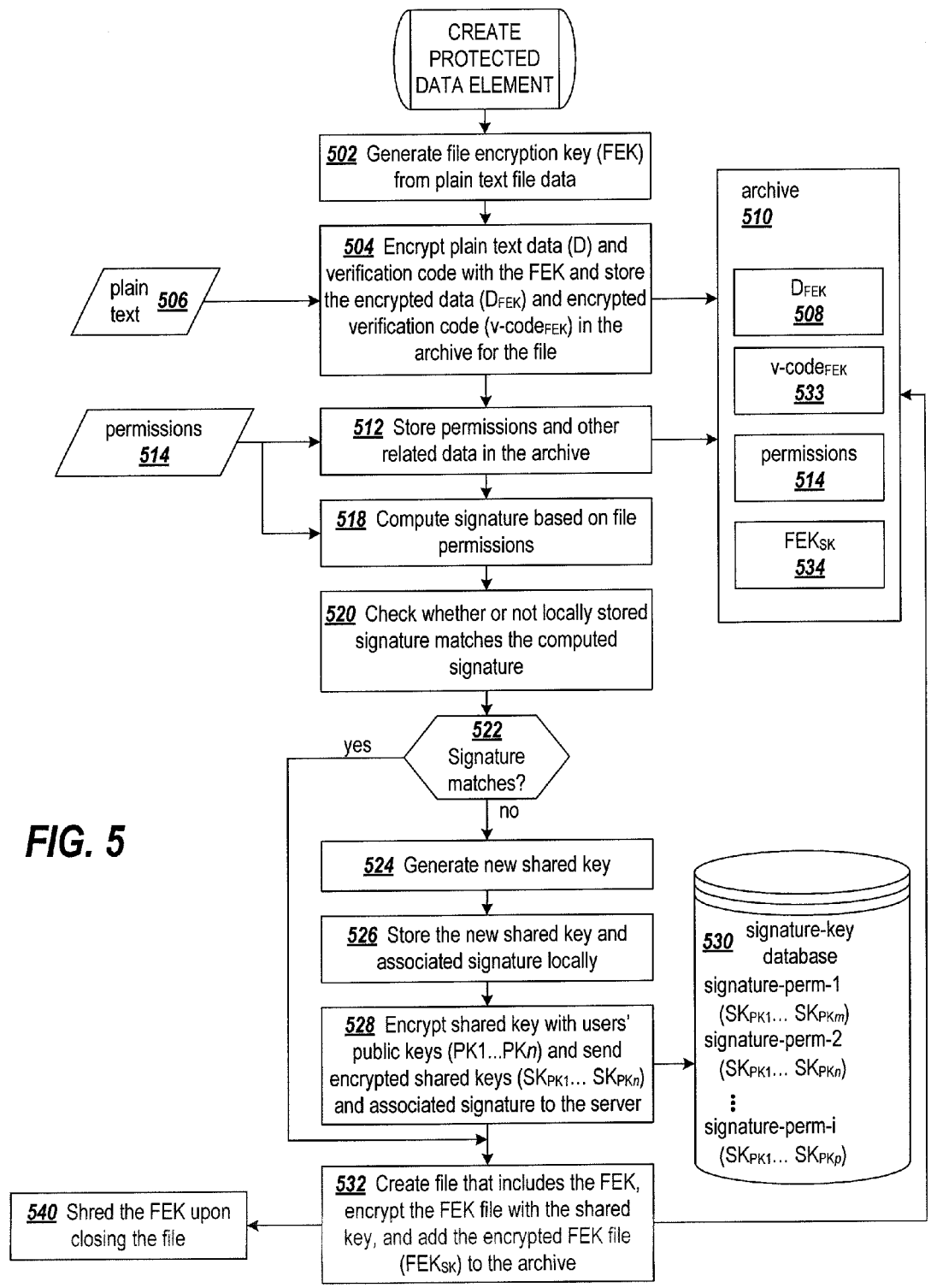
FIG. 5 is a flowchart of a process for creating a protected data element.

FIG. 5 is a flowchart of a process for creating a protected data element. At block 502, a file encryption key (FEK) is generated to be used to encrypt the data element. At block 504, the plain text data element 506 may be encrypted using the FEK. In addition, a verification code may be encrypted using the FEK. The verification code may be subsequently used for authentication purposes when attempting to read the encrypted data element. In an example implementation, the verification code may be generated from a hash function, such as SHA-1 or SHA-256, applied to the plaintext data element. Both the encrypted data element $D_{FEK}$ 508 and the encrypted verification code v-code$_{FEK}$ 533 are stored in the archive 510. Any cryptographically secure method of authentication such as an HMAC or encryption techniques, for example, CWC mode, that perform both encryption and authentication may also be used. In an example implementation, the archive file is a POSIX tar format file. It will be appreciated that other proprietary or open source types of archives or containers may be suitable.

The permissions 514 and other related data are also stored in the archive 510 at block 512. The related data may include metadata that describe the data element and/or archive, such as version number, date/time of last modification, device on which the data element was last modified, the owner of the archive, date/time that the archive was created, identification of the encryption algorithm employed to encrypt the data element, a file type, and size, for example. Other related data may include keywords and thumbnails.

At block 518, a signature is calculated from the permissions 514, which control access to the data element. In an example implementation, the signature is the left-most 12-bytes of the MD5 hash of an ordered JSON string that represents the permissions. Block 520 checks whether or not the generated signature matches a previously generated signature stored locally at the client. If the generated signature does not match any locally stored signature at decision block 522, a new shared key needs to be generated, and the process is directed to block 524.

A new shared key is generated at block 524. The shared key is a random 256-bit AES key and may be generated by obtaining 32 bytes of random data from the OpenSSL Rand interface as indicated above. At block 526, the shared key is stored locally on the client system in association with the generated signature. The local storage of the signature and shared key is in volatile RAM and not in retentive (e.g., disk) storage of the client system. Once the shared key is no longer needed by the client system, it is securely shredded. That is, the memory occupied by the shared key may be overwritten with irrelevant data.

At block 528, the new shared key is encrypted with the public keys of those users identified in the permissions as having access to the data element. That is, for each user, the shared key is encrypted with that user's public key and that encrypted shared key is saved so that the user can later decrypt the encrypted FEK. Also at block 528, the encrypted shared keys and associated signature are transmitted to the server system for storage in a signature-key database 530.

A file is created to store the FEK, and that file is encrypted using the shared key at block 532. The encrypted FEK file $FEK_{SK}$ 534 is also added to the archive 510 at block 532. Upon closing the archive, the FEK is shredded at block 540. That is, once access to the archive and its contents is no longer needed on the client system, the memory occupied by the FEK may be overwritten with irrelevant data.

Figure 6:
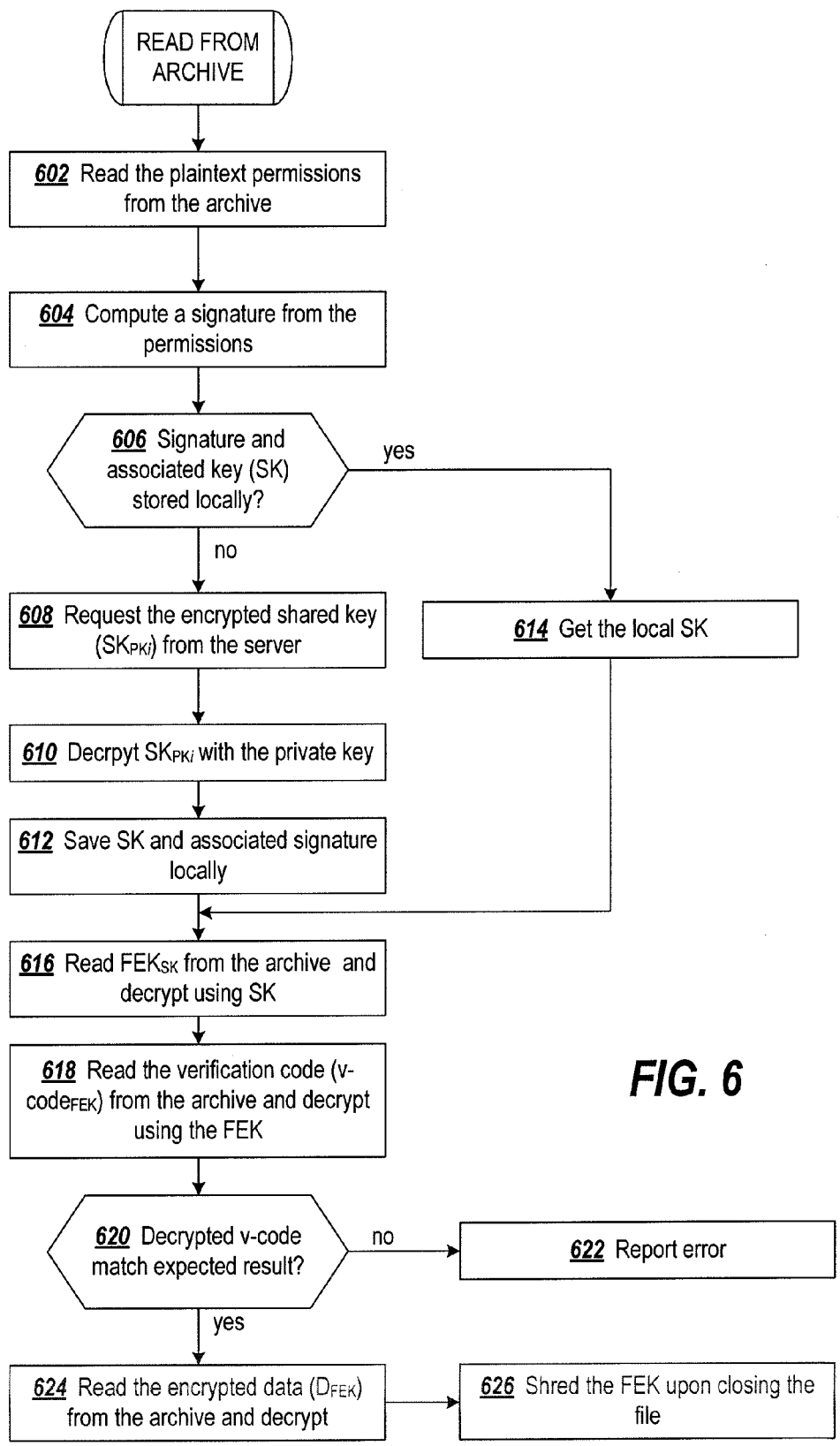
FIG. 6 is a flowchart of a process for reading a protected data element.

FIG. 6 is a flowchart of a process for reading a protected data element. As indicated above, the data element and archive may be shared through a variety of channels and protocols. At block 602, the permissions are extracted from the archive, and a signature of the permissions is computed at block 604. If the computed signature does not match a locally stored signature, decision block 606 directs the process to block 608 where the client system requests the encrypted shared key from the server system. For example, the encrypted shared key for user i would be $SK_{PKi}$. The request to the server system includes the computed signature so that the server system can retrieve the associated set of keys.

At block 610, the encrypted shared key $SK_{PKi}$ returned from the server system is decrypted with the user's private key, and the decrypted shared key SK is stored locally along with the signature at block 612. If the computed signature had previously been stored at the client system, decision block 606 directs the process to block 614 where the associated shared key is obtained.

At block 616, the encrypted file encryption key $FEK_{SK}$ is read from the archive and decrypted using the shared key, which was obtained at either block 610 or block 614. The encrypted verification code (v-code$_{FEK}$) is read from the archive and decrypted using the FEK at block 618. If the decrypted v-code matches the expected result, decision block 620 directs the process to block 624 to read the encrypted data element ($D_{FEK}$) from the archive and decrypt $D_{FEK}$ using the FEK. At block 626, the FEK is shredded when it is no longer needed. If the decrypted v-code does not match the expected result, an error is reported at block 622.

Figure 7:
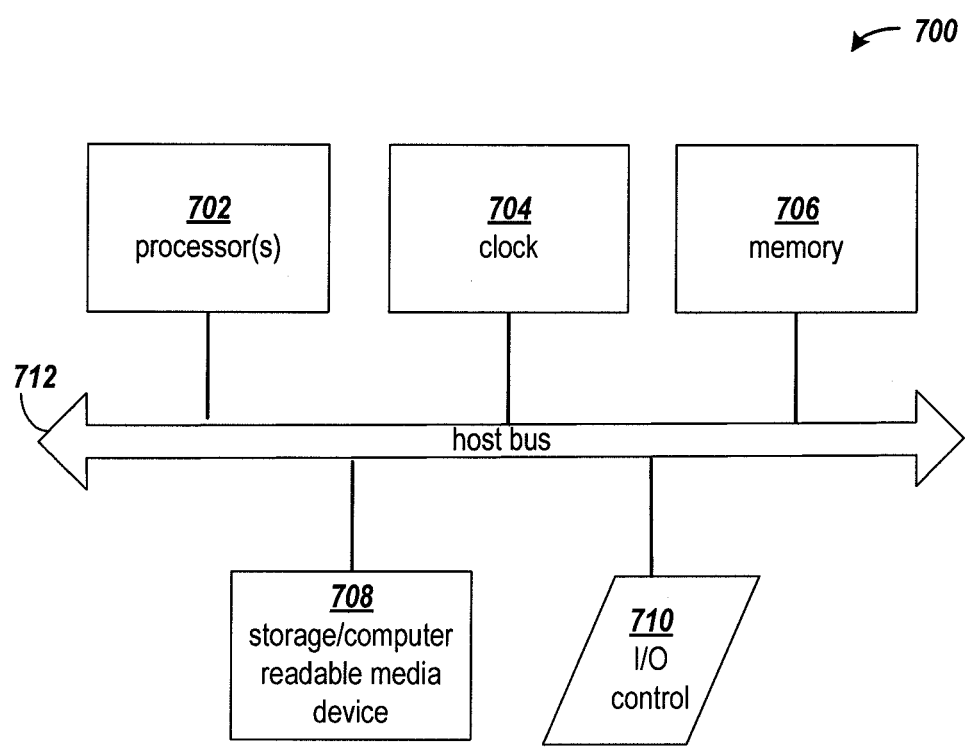
FIG. 7 is a block diagram of an example computing arrangement on which the processes described herein may be implemented.

FIG. 7 is a block diagram of an example computing arrangement on which the processes described herein may be implemented. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory arrangement 706, a storage arrangement 708, and an input/output control arrangement 710, all coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory arrangement 706 and storage arrangement 708 may be combined in a single arrangement.

The processor(s) 702 executes the software in storage arrangement 708 and/or memory arrangement 706, reads data from and stores data to the storage arrangement 708 and/or memory arrangement 706, and communicates with external devices through the input/output control arrangement 710. These functions are synchronized by the clock signal generator 704. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for securing shared data. Other aspects will be apparent to those skilled in the art from consideration of the specification. The methods and systems may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of data deduplication, comprising:
   on a programmed processor device, performing operations including:
   generating a first key from plain text data of a first data element;
   encrypting the first data element using the first key, resulting in an encrypted first data element;
   comparing the first key to each key of a plurality of previously stored keys, wherein the keys of the plurality of previously stored keys are associated with other encrypted data elements, respectively;
   in response to the first key matching a second key of the plurality of previously stored keys, comparing the encrypted first data element to the other encrypted data element encrypted by the second key;
   in response to the encrypted first data element matching the other encrypted data element encrypted by the second key:
   associating the first key with the other encrypted data element encrypted by the second key; and
   discarding the encrypted first data element.

2. The method of claim 1, further comprising:
   in response to the encrypted first data element not matching the other encrypted data element associated with the second key:
   storing the encrypted first data element; and
   associating the first key with the stored encrypted first data element.

3. The method of claim 2, wherein the associating the first key with the stored encrypted first data element includes:
   creating an archive file;
   encrypting the first key; and
   including the encrypted first data element and the encrypted first key in the archive file.

4. The method of claim 2, wherein the associating the first key with the stored encrypted first data element includes:
   encrypting the first key;
   storing the encrypted first key in a database that maps keys to storage locations of encrypted data; and
   storing reference data in the database in association with the encrypted first key, the reference data indicating a storage location of the stored encrypted first data element.

5. The method of claim 2, wherein:
   the first data element includes metadata and non-metadata;
   the plain text data of the first data element is non-metadata; and
   the storing of the encrypted first data element includes storing the encrypted first data element in alignment with a block boundary.

6. The method of claim 5, wherein the storing of the encrypted first data element in alignment with a block boundary is in response to a user-configurable parameter indicating a block size.

7. The method of claim 5, wherein the storing of the encrypted first data element in alignment with a block boundary is in response to one user-configurable parameter of one or more user-configurable parameters indicating different block sizes.

8. The method of claim 1, further comprising:
   in response to the first key not matching a second key of the plurality of previously stored keys:
   storing the encrypted first data element; and
   associating the first key with the stored encrypted first data element.

9. The method of claim 8, wherein the associating the first key with the stored encrypted first data element includes:
   creating an archive file;
   encrypting the first key; and
   including the encrypted first data element and the encrypted first key in the archive file.

10. The method of claim 8, wherein associating the first key with the stored encrypted first data element includes:
    encrypting the first key;
    storing the encrypted first key in a database that maps keys to storage locations of encrypted data; and
    storing reference data in the database in association with the encrypted first key, the reference data indicating a storage location of the stored encrypted first data element.

11. The method of claim 1, wherein the first data element is a block of a file.

12. The method of claim 1, wherein the first data element includes a plurality of blocks of a file.

13. The method of claim 1, wherein:
    the first data element is a file having a plurality of blocks;
    the generating of the first key from plain text data of a first data element includes:
    selecting one block of the plurality of blocks of the file;
    generating the first key from the one block; and
    the encrypting of the first data element includes encrypting the plurality of blocks of the file using the first key.

14. The method of claim 1, wherein the generating of the first key includes generating the first key from the plain text data of a first data element and an identifier of a storage location of the first data element.

15. A method of data deduplication, comprising:
on a programmed processor device, performing operations including:
generating a first key from plaintext data of a first data element;
encrypting a counter value using a file encryption key (FEK);
applying an exclusive-or function to the first data element and the counter value, resulting in a protected element;
comparing the first key to each key of a plurality of previously stored keys, wherein the keys of the plurality of previously stored keys are associated with other protected data elements, respectively;
in response to the first key matching a second key of the plurality of previously stored keys, comparing the protected first data element to the other protected data element encrypted by the second key;
in response to differences between the protected first data element and the other protected data element encrypted by the second key being less than a threshold:
storing differences between the protected first data element and the other protected data element;
associating the first key with the stored differences and the other protected data element; and
discarding the protected first data element.

16. The method of claim 15, further comprising:
in response to the differences between the protected first data element and the other protected data element being greater than the threshold:
storing the protected first data element; and
associating the first key with the stored protected first data element.

17. The method of claim 15, further comprising:
in response to the first key not matching a second key of the plurality of previously stored keys:
storing the protected first data element; and
associating the first key with the stored protected first data element.

18. The method of claim 15, wherein the generating of the first key includes generating the first key using less than all of the plaintext data of the first data element.

19. A system that deduplicates data, comprising:
a memory arrangement;
a processor device coupled to the memory arrangement, wherein the memory arrangement is configured with instructions that when executed by the processor device cause the processor device to:
generate a first key from plain text data of a first data element;
encrypt the first data element using the first key, resulting in an encrypted first data element;
compare the first key to each key of a plurality of previously stored keys, wherein the keys of the plurality of previously stored keys are associated with other encrypted data elements, respectively;
in response to the first key matching a second key of the plurality of previously stored keys, compare the encrypted first data element to the other encrypted data element encrypted by the second key;
in response to the encrypted first data element matching the other encrypted data element encrypted by the second key:
associate the first key with the other encrypted data element encrypted bar the second key; and
discarding the encrypted first data element.

20. A system that deduplicates data, comprising:
a memory arrangement;
a processor device coupled to the memory arrangement, wherein the memory arrangement is configured with instructions that when executed by the processor device cause the processor device to:
generate a first key from plaintext data of a first data element; encrypt a counter value using a file encryption key (FEK);
apply an exclusive-or function to the first data element and the counter value, resulting in a protected element;
compare the first key to each key of a plurality of previously stored keys, wherein the keys of the plurality of previously stored keys are associated with other protected data elements, respectively;
in response to the first key matching a second key of the plurality of previously stored keys, compare the protected first data element to the other protected data element encrypted by the second key;
in response to differences between the protected first data element and the other protected data element encrypted by the second key being less than a threshold:
store differences between the protected first data element and the other protected data element;
associate the first key with the stored differences and the other protected data element; and
discard the protected first data element.

* * * * *